(12) United States Patent
Holla et al.

(10) Patent No.: US 10,728,108 B2
(45) Date of Patent: Jul. 28, 2020

(54) NETWORK HEALTH CHECKER

(71) Applicant: Nicira, Inc., Palo Alto, CA (US)

(72) Inventors: Aditya G. Holla, Palo Alto, CA (US); Ramya Bolla, Sunnyvale, CA (US); Manoj Tammali, Redwood City, CA (US); Vaibhav Kumar, Sunnyvale, CA (US); Nithya Vijayaraghavan, Palo Alto, CA (US)

(73) Assignee: NICIRA, INC., Palo Alto, CA (US)

( * ) Notice: Subject to any disclaimer, the term of this patent is extended or adjusted under 35 U.S.C. 154(b) by 518 days.

(21) Appl. No.: 15/421,387

(22) Filed: Jan. 31, 2017

(65) Prior Publication Data

US 2018/0123903 A1 May 3, 2018

Related U.S. Application Data

(60) Provisional application No. 62/415,467, filed on Oct. 31, 2016.

(51) Int. Cl.
*H04L 12/24* (2006.01)
*H04L 12/751* (2013.01)
*H04L 12/805* (2013.01)
*H04L 12/26* (2006.01)

(52) U.S. Cl.
CPC .............. *H04L 41/22* (2013.01); *H04L 41/12* (2013.01); *H04L 45/02* (2013.01); *H04L 41/0816* (2013.01); *H04L 43/10* (2013.01); *H04L 43/12* (2013.01); *H04L 47/36* (2013.01)

(58) Field of Classification Search
CPC ......... H04L 41/22; H04L 41/12; H04L 45/02; H04L 47/36; H04L 41/0816; H04L 43/10; H04L 43/12
See application file for complete search history.

(56) References Cited

U.S. PATENT DOCUMENTS

| 6,732,114 | B1 * | 5/2004 | Aamodt | G06Q 10/10 |
| | | | | 707/999.102 |
| 8,787,154 | B1 * | 7/2014 | Medved | H04L 45/64 |
| | | | | 370/225 |
| 9,197,509 | B1 * | 11/2015 | Kabbani | H04L 41/12 |
| 9,450,817 | B1 * | 9/2016 | Bahadur | H04L 45/64 |
| 9,450,846 | B1 * | 9/2016 | Huang | H04L 43/0858 |
| 2006/0031445 | A1 * | 2/2006 | Rajan | H04L 41/042 |
| | | | | 709/223 |
| 2009/0132698 | A1 * | 5/2009 | Barnhill, Jr. | H04L 12/2809 |
| | | | | 709/224 |

(Continued)

*Primary Examiner* — Benjamin M Thieu
(74) *Attorney, Agent, or Firm* — Adeli LLP

(57) ABSTRACT

A method of generating a network topology map in a datacenter comprising a network manager server and a set of host machines is provided. Each host machine hosts a set of data compute nodes (DCNs). The method receives information regarding the configuration of each of a set of logical networks from the network manager server. Each logical network is connected to several DCNs. The method identifies logical connections configured between the DCNs using the configuration of the overlay networks. The method generates a network topology map based on the identified logical configuration. The network topology identifies the DCNs that are connected to each overlay network. The method displays the network topology map on a graphical user interface.

20 Claims, 13 Drawing Sheets

(56) References Cited

U.S. PATENT DOCUMENTS

| | | | |
|---|---|---|---|
| 2013/0290955 A1* | 10/2013 | Turner | H04L 41/12 718/1 |
| 2014/0010109 A1* | 1/2014 | Himura | H04L 41/12 370/254 |
| 2014/0344438 A1* | 11/2014 | Chen | H04L 12/6418 709/223 |
| 2017/0295070 A1* | 10/2017 | Yang | H04L 41/16 |

* cited by examiner

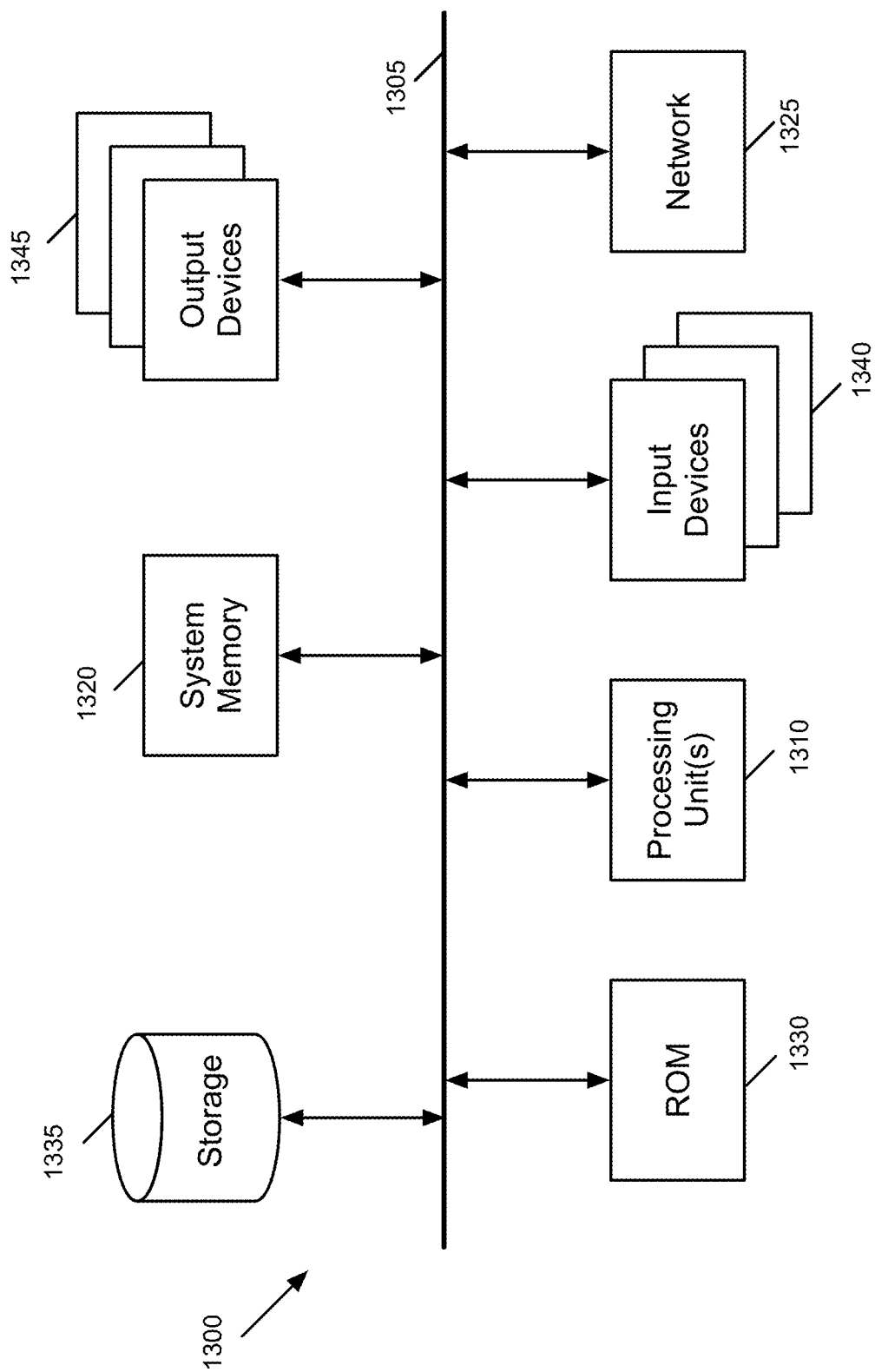

NETWORK HEALTH CHECKER

CLAIM OF BENEFIT TO PRIOR APPLICATIONS

This application claims the benefit of U.S. Provisional Patent Application 62/415,467, filed Oct. 31, 2016. U.S. Provisional Patent Application 62/415,467 is incorporated herein by reference.

BACKGROUND

With the advent of network virtualization and software-defined networking (SDN), new issues are surfacing in the field of network troubleshooting. The number of physical or virtual nodes and entities has increased by leaps and bounds in a software-defined datacenter (SDDC) network. Virtual switches, virtual routers, edge gateways, distributed firewalls, load-balancers, etc., are just some of the new nodes that add to the complexity of network troubleshooting. As a result, network troubleshooting has become even more painful and cumbersome. Two of the major issues in SDDC network troubleshooting are lack of proper network topology diagrams and lack of a proactive network health monitoring system.

Traditional networking provides a basic topology diagram to provide an idea of which virtual machine (VM) port or kernel port is located on which host. The basic topology may also indicate the virtual switch/virtual distributed switches and physical network interface card (PNIC) that these ports are connected to. However, in a SDN there are a lot more entities coming into the picture and understanding how these entities are tied together is a key to network troubleshooting.

In a majority of SDDC network issues escalated by customers, there is need for a proper topology diagram for efficient troubleshooting. Currently, there are no tools for generating the topology for SDDC networks. The collection of topology information from customers is done purely manually, which opens up a lot of opportunities for introducing errors.

There is a lot of back and forth with customers to get the customers' network topology information or diagrams. Even after putting in so much time and effort there is always some missing topology information. Sometimes, the information shared by the customer is incorrect. Even after collecting all the information from the customer, it is possible that the SDDC engineers may interpret the information incorrectly as there is no standard way to represent the topology. Some customers don't even have a topology diagram to share with the SDDC support personnel. The support personnel have to look at their environment and manually build it on their own environment. The user may also misconfigure the topology. It is possible that users might sometime connect VMs/logical switches/distributed logical routers incorrectly since they do not have a way to visualize the topology.

The errors introduced by manual efforts leads to missing pieces of critical topology data. This wastes a lot of engineering time and resources in the attempts to get proper topology information form customers. The errors introduced by manual efforts also lead to misdiagnoses of network problems reported by the customers.

Another major issue in SDDC network troubleshooting is the lack of proactive network health monitoring system. The support personnel come to the realization that a network issue has occurred only after the damage is done. There are no tools to proactively monitor the health of the network overlay links. For instance, parameters such as reachability of packets between any two VMs running on a network platform, latency variation of logical links between any two VMs, and maximum transmission unit (MTU) variation of logical links between any two VMs cannot be currently monitored.

BRIEF SUMMARY

Some embodiments provide an automated framework for dynamically learning a logical network topology and figuring out the configured logical links in a datacenter. Two VMs have a configured logical link between them when the two VMs are connected either via a logical switch or a distributed logical router. A topology generator receives the information regarding the logical network configuration from network and compute manger servers of the datacenter. The topology generator identifies the logical connections between different network entities such as VMs, logical switches, logical routers, and edge gateways based on the logical received network configuration.

The topology generator generates a network topology diagram for the logical network by using the identified logical connections. The topology generator displays the topology diagram on a graphical user interface and dynamically updates any changes to the logical network topology. The logical network in some embodiments is an overlay network.

Some embodiments provide a health monitor on each host machine. The health monitor receives the source and destination information for the configured logical links between each VM on the host and other VMs in the datacenter. The health monitor proactively monitors the configured links by periodically sending probe packets (e.g., spoof Internet control message protocol (ICMP) packets) to each destination VM.

Based on the responses or lack of responses to the spoof ICMP packets, the health monitor deducts the reachability, latency, and MTU configuration issues on the logical links. The health monitor sends the status of each logical link to the topology generator to visually identify the health status of the logical link on the topology diagram.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

FIG. 13 conceptually illustrates an electronic system with which some embodiments of the invention are implemented.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a topology generator that receives the information regarding the logical network configuration, identifies the logical connections between different network entities such as VMs, logical switches, logical routers, and edge gateways, and generates a network topology diagram for the logical network by using the identified logical connections.

Some embodiments provide a network health monitor that receives the information about the source and destination VMs on each configured logical link of a logical network. The health monitor proactively monitors the configured links by periodically sending probing packets (e.g., spoof ICMP packets). Based on the reply, the health monitor deducts the reachability, latency and MTU configuration issues on the logical links.

Figure 1:
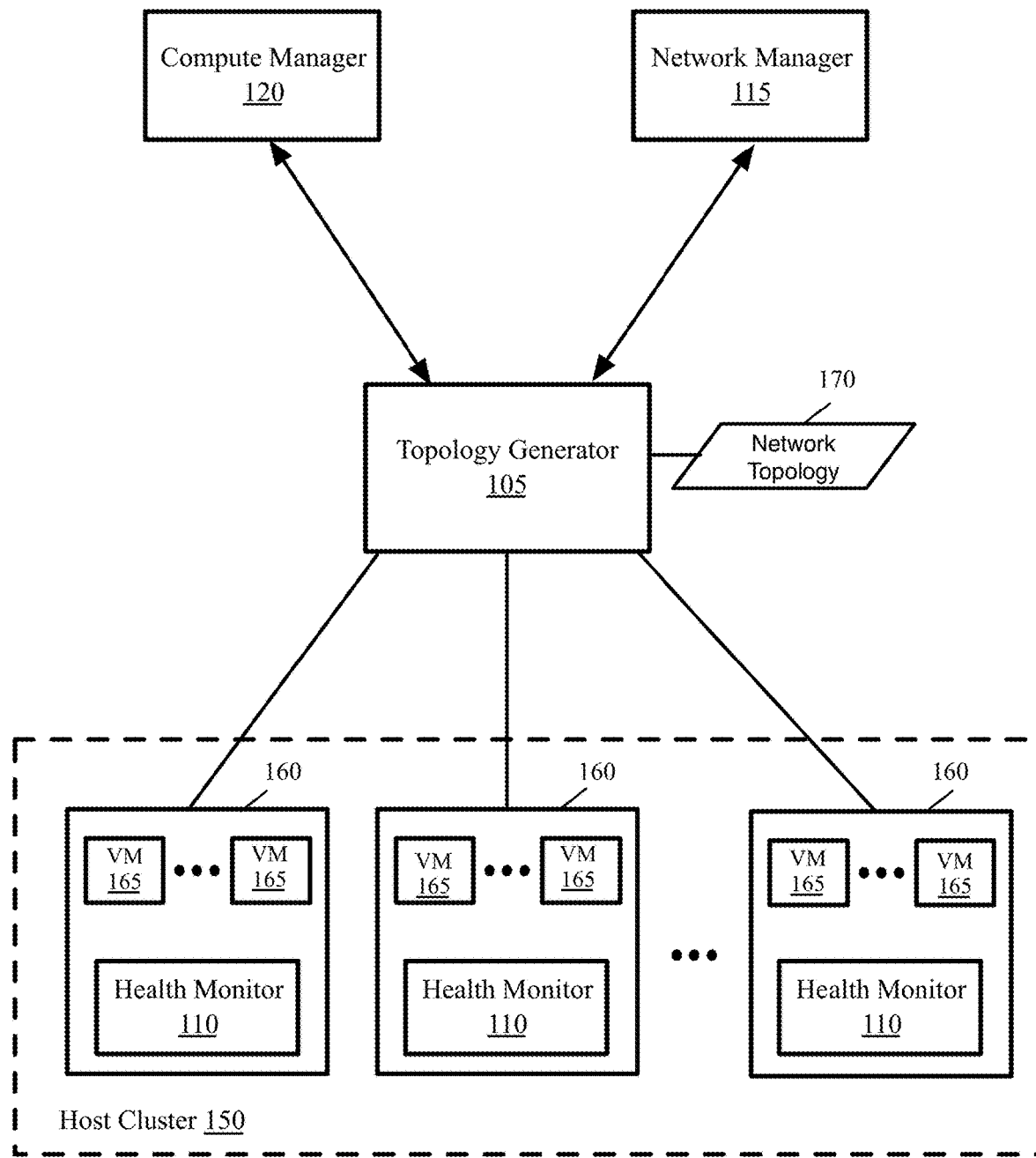
FIG. 1 conceptually illustrates a network health checker in some embodiments.

FIG. 1 conceptually illustrates a network health checker in some embodiments. The figure also shows a cluster 150 of several host machines 160 in a datacenter. Each host machine 160 hosts one or more VMs 165. As shown, the health checker has two components: a front-end topology generator 105 and one or more health monitors 110. The topology generator 105 receives network configuration information from network manager 115 through a set of application programming interfaces (APIs). The topology generator also receives information about the VMs that are hosted on each host from the compute manager 120.

The topology generator identifies the logical connections between the VMs 165 based on the information received from the network manager and compute manger. The topology generator generates the network topology 170. For instance, the topology generator generates the network topology as a report and/or displays the network topology as a connection diagram on a graphical user interface (e.g., at one or more administrator's terminals).

Several more detailed embodiments of the invention are described below. Section I describes network topology generation. Section II describes logical link health monitoring. Finally, Section III describes an electronic system with which some embodiments of the invention are implemented.

I. Network Topology Generation

Figure 2:
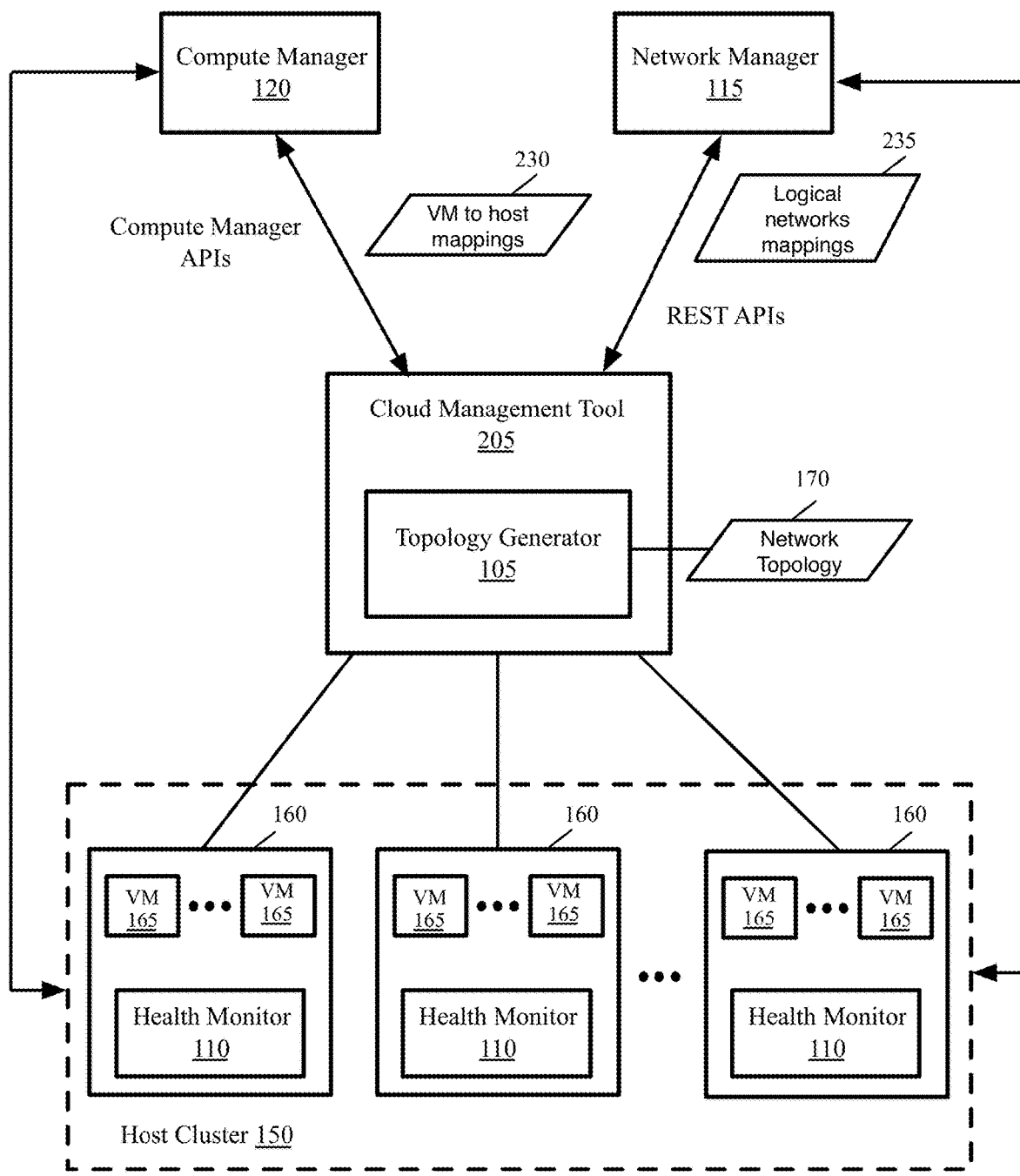
FIG. 2 conceptually illustrates a topology generator in some embodiments.

In some embodiments, the topology generator 105 is implemented as an adapter to a cloud management tool that provides APIs to the compute and network managers. FIG. 2 conceptually illustrates a topology generator in some embodiments. The topology generator in the example of FIG. 2 is implemented as an adapter of a cloud management tool 205. The cloud management tool 205 provides a set of APIs to compute and network managers in order to create and manage different compute and network entities such as VMs, logical networks, managed forwarding elements, etc. In other embodiments, the topology generator is part of other applications available in the framework.

As shown, the cloud management tool utilizes a set of representational state transfer (REST or RESTful) application programming interfaces with the network manager 115. The network manager in some embodiments is a virtualized server that is installed on one or more physical servers and is used to define and/or manage the networking resources of a datacenter. Each REST API identifies a resource or a service by a unique identifier and indicates what actions have to be performed on the identified resource or service. In some embodiments, the topology generator utilizes the APIs provided by the cloud management tool 205 to receive the logical networks mappings 235 from the network manager 115. For instance, the logical network mappings may be provided by the network manager by identifying the VMs, forwarding elements, logical routers, and gateways that are configured to be on the same logical network (or the same overlay network).

The cloud management tool 205 also utilizes a set of APIs to communicate with the compute manager 120. The compute manager in some embodiments is a virtualized server that is installed on one or more physical servers. The compute manager is used to manage compute infrastructure (e.g., the hosts and VMs) of a datacenter. In some embodiments, the topology generator utilizes the APIs provided by the cloud management tool 205 to receive the VM to host mappings 230 from the compute manager 120.

The topology generator gathers information regarding the VM to host mappings and network configuration (for example the configuration of overlay networks) from the compute and network managers and generates a topology diagram for the network. In the following discussions, the overlay networks are used as an example of a logical network. It should be understood that the topology generator can gather information regarding other types of logical networks.

An overlay network is a network virtualization technology that achieves multi-tenancy in a computing environment. Examples of overlay networks include Virtual eXtensible LAN (VXLAN), Generic Network Virtualization Encapsulation (GENEVE), and Network Virtualization using Generic Routing Encapsulation (NVGRE). For instance, VXLAN is an L2 overlay scheme over a Layer 3 (L3) network. VXLAN encapsulates an Ethernet L2 frame in IP (MAC-in-UDP encapsulation) and allows VMs to be a part of virtualized L2 subnets operating in separate physical L3 networks. Similarly, NVGRE uses Generic Routing Encapsulation (GRE) to tunnel L2 packets over L3 networks.

The followings are examples of API calls that the topology manager makes in some embodiments to gather information regarding the overlay network links:

https://<CmpMgr IP>/sdk (CmpMgr API call)
https://<NtwrkMgr IP>/api/4.0/edges (Rest API call)

where CmpMgr IP is the Internet Protocol (IP) address of the compute manager, NtwrkMgr IP is the IP address of the network manager, sdk is an exemplary software development kit that interfaces with the compute manager, and api/4.0/edges is an exemplary API used to interface with the network manager. In operation, each API call has a set of parameters to inquire about different network and compute configurations of the datacenter.

Using these API calls, the topology generator identifies different mappings in the network deployment. The topology generator identifies mappings such as VM to host, VM to forwarding element, forwarding element to distributed logical router (DLR), and DLR to edge gateway.

The VM to host mappings determines the VMs 165 that are hosted on each host 160. The VM to forwarding element mappings, forwarding element to DLR mappings, and DLR to edge gateway mappings identify the logical links of the network. In some embodiments, each host machine in the network includes virtualization software (e.g., a hypervisor) for virtualizing physical resources of the host machine and a host managed forwarding element (MFE) for forwarding network traffic (e.g., data messages) to and from the virtual machines. The host MFE, in some embodiments, operates within the virtualization software. In addition, some host machines include one or more VMs that connect to the host MFE.

In some embodiments, the host MFEs are configured to logically forward data messages according to logical forwarding elements (e.g., logical switches, logical routers) configured by an administrator of the network to implement a logical forwarding element (LFE) of a logical network. In some embodiments, the logical network is an abstract conception of a network generated by an administrator, and the logical network is implemented in a virtualized, distributed manner in a managed physical infrastructure (e.g., in a multi-tenant datacenter). That is, the VMs that connect to the LFEs may reside on various different host machines within the infrastructure, and MFEs (e.g., software virtual switches) operating on these host machines implement some or all of the logical forwarding elements (logical switches, logical routers, etc.).

In the virtualization field, some refer to software switches as virtual switches as these are software elements. However, in this specification, the software forwarding elements are referred to as MFEs, in order to distinguish them from LFEs, which are logical constructs that are not tied to the physical world. An MFE forwards packets in a physical network whether or not it is implemented in software while an LFE forwards packets in a logical network, which is logically decoupled or abstracted from the physical network. In other words, the software forwarding elements exist and operate in the physical world, whereas an LFE is a logical representation of a forwarding element that is presented to a user when designing a logical network.

In some embodiments, several MFEs distributed throughout the network implement tenant's LFEs, where each MFE is a local instantiation of an LFE that operate across different host machines and can perform Open Systems Interconnection (OSI) model Layer 2 (L2)/Layer 3 (L3) packet forwarding between VMs on the host machine or on different host machines. An LFE is sometimes referred to as a virtual distributed switch (VDS).

A DLR provides a one-hop routing that enables a packet to be sent between two LFEs without going through a gateway. A DLR handles the east-west traffic within a data center. East-west traffic is the communication between virtual machines within the datacenter.

An edge gateway is a virtual router that resides at the edge of the network (e.g., as an interface to external networks) and provides network services such as dynamic host configuration protocol (DHCP), firewall, network address translation (NAT), static routing, virtual private network (VPN), and load balancing.

Figure 3:
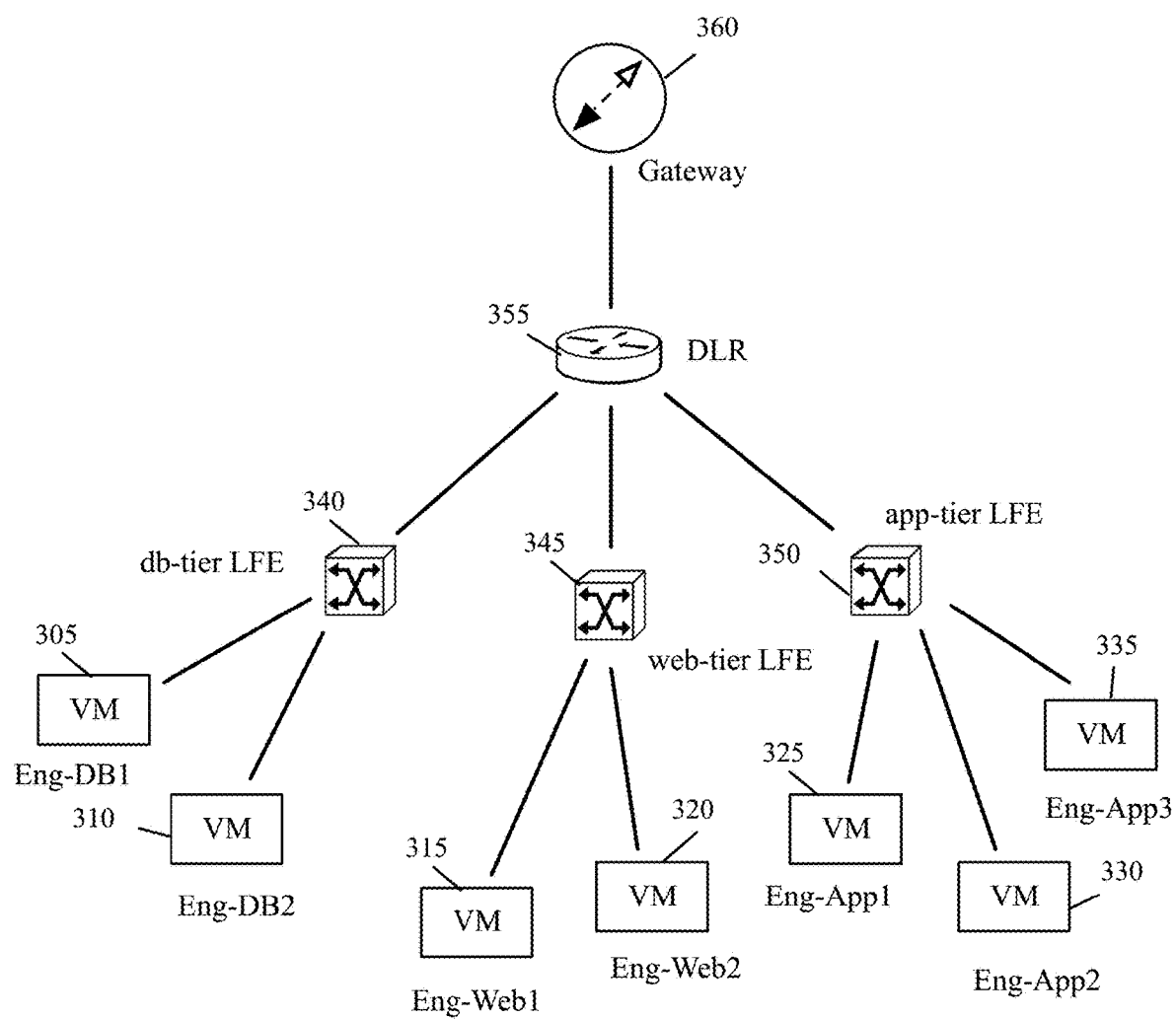
FIG. 3 illustrates an example of an overlay topology diagram generated by the topology generator in some embodiments.

Using the identified mappings (i.e., VM to host, VM to forwarding element, forwarding element to DLR, and DLR to edge gateway mappings) the topology generator builds a parent-child relationship between different entities (such as VMs, MFEs, LFEs, DLRs, edge gateways, etc.) in the overlay network. This parent-child relationship is then used to generate an overlay topology diagram that is presented (e.g., as a connection diagram) in a graphical user interface. FIG. 3 illustrates an example of an overlay topology diagram generated by the topology generator in some embodiments. The figure shows the network topology of a 3-tiered enterprise application that includes a web tier, an application (app) tier, and a database (db) tier. The web tier includes the presentation interface, the application tier includes the business logical, and the database tier includes the databases and manages read and write to these databases.

In the example of FIG. 3, the web tier includes two VMs 315-320 for an engineering department. The two VMs 315-320 are connected by the web-tier LFE 345. The application tier includes three VMs 325-335 for the engineering department. The three VMs 325-335 are connected by the app-tier LFE 350. The database tier includes two VMs 305-310 for the engineering department. The two VMs 305-310 are connected by the db-tier LFE 340.

The three LFEs 340-350 are connected to each other through DLR 355. The DLR is connected to an edge gateway 360. Each one of the connections in the figure is identified by the topology generator through API calls to the compute and network manager. The diagram of FIG. 3 in some embodiments is displayed on a graphical user interface (GUI).

Figure 4:
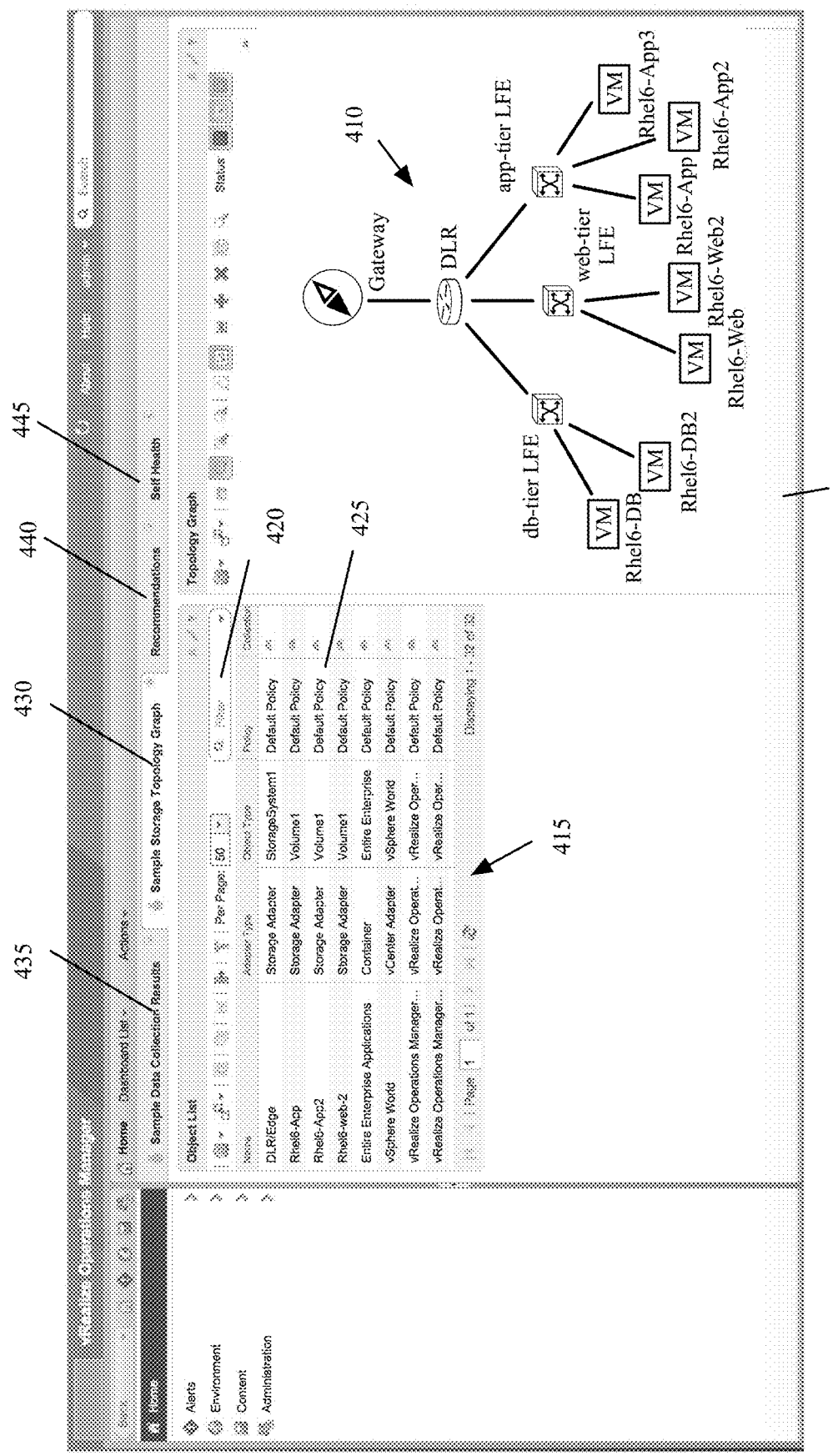
FIG. 4 conceptually illustrates a graphical user interface (GUI) that is provided by the topology generator in some embodiments.

FIG. 4 conceptually illustrates a GUI that is provided by the topology generator in some embodiments. As shown, the GUI includes a display area 405 for displaying the topology diagram 410. The GUI also displays a list 415 of the objects identified by the topology generator. The list is displayed as a report that shows different properties of each object and allows a user (e.g., an administrator) to apply different filters 420, display and assign different policies 425 to the objects, etc.

As shown, the tab 430 labeled "sample storage topology graph" is currently selected in order to display the topology graph. The GUI also provide other options to show data collection results 435, to show and change user recommendation 440, and perform health monitoring 445.

The topology generator in some embodiments dynamically accounts for any changes in the overlay network. The topology generator 105 (shown in FIGS. 1 and 2) periodically queries network manager 115 and compute manager 120 using their APIs and dynamically changes the topology diagram if there are any changes in the topology.

Figure 5:
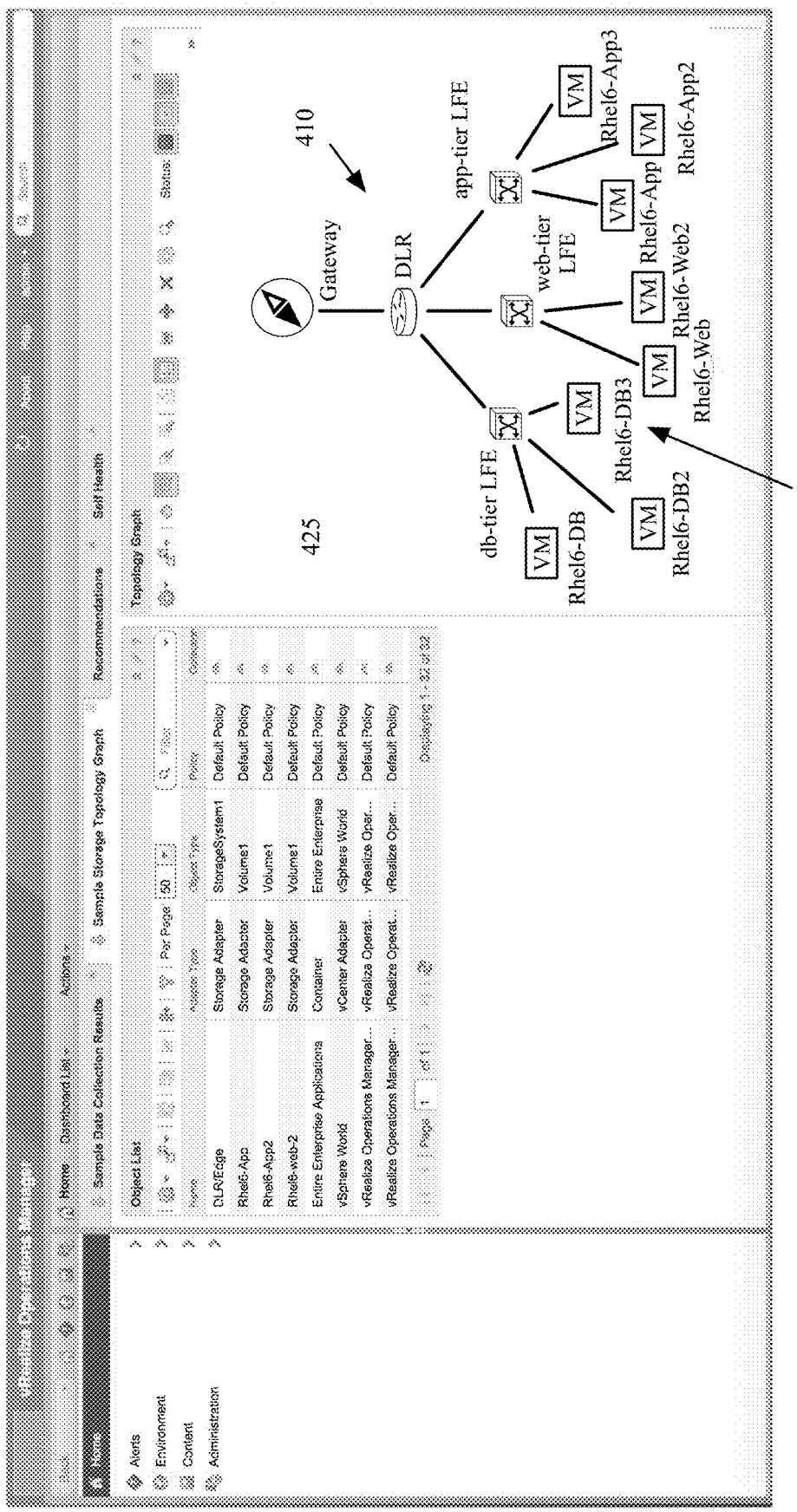
FIG. 5 illustrates a dynamic change in the topology diagram of FIG. 4 when a new database VM is added to the application tier.

FIG. 5 illustrates a dynamic change in the topology diagram of FIG. 4 when a new database VM is added to the application tier. As shown, the topology diagram is dynamically updated to show the newly added Rheld-DB3 VM 505.

Figure 6:
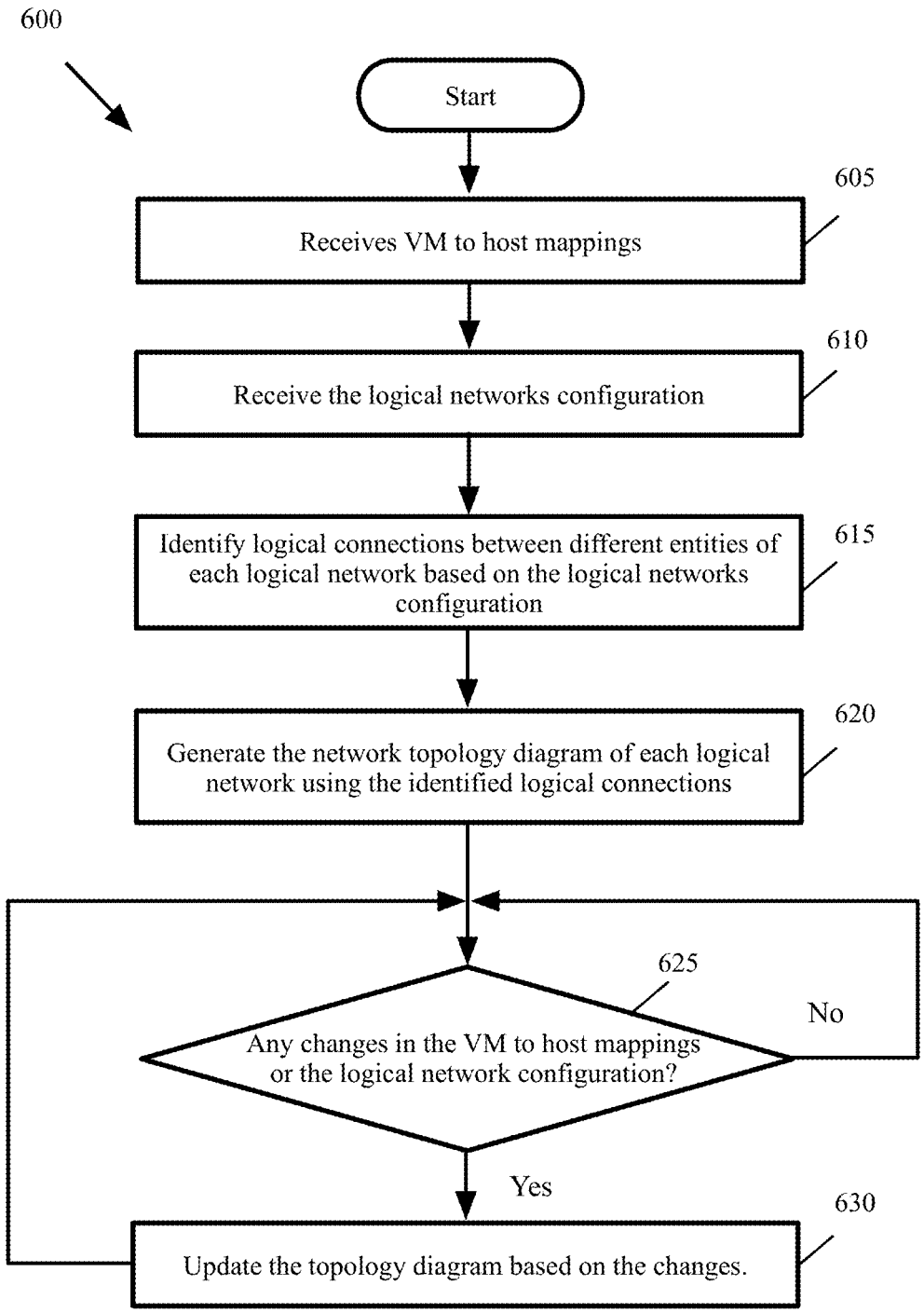
FIG. 6 conceptually illustrates a process for generating a network topology diagram in some embodiments.

FIG. 6 conceptually illustrates a process 600 for generating a network topology diagram in some embodiments. The process in some embodiments is performed by a topology generator such as the topology generator shown in FIGS. 1 and 2. As shown, the process receives (at 605) VM to host mappings. For instance, the topology generator in FIG. 2 receives the identification of the VMs that are hosted on each host using the compute manager APIs.

The process then receives (at 610) the logical networks configurations. For instance, the topology generator in FIG. 2 receives the configuration of each overlay network (or other types of logical network) from the network manager using the REST APIs. In some embodiments, each host machine may host VMs that belong to several different tenants. Each tenant typically generates one or more logical networks for connecting the VMs of the tenant. Each of these logical networks can be implemented by defining an overlay network. In some embodiments, the topology generator receives the information regarding the VMs that are connected to each overlay network from the network manager through the REST API. In other embodiments, the topology generator receives the overlay networks configurations from the network manager (or other entities in the datacenter) through means other than making REST API calls to the network manager.

Next, the process identifies (at 615) the logical connections between different entities of each logical network based on the logical network configuration. For instance, the topology generator identifies groups of VMs, LFEs, DLRs, and edge gateways that are on the same logical network (or are connected to the same overlay network) as logically connected to each other.

The process then generates (at 620) the network topology for each logical network using the logical connections between different entities of the logical network such as VMs, LFEs, DLRs, and edge gateways. For instance, the topology generator generates a report (e.g., a list, a table, a diagram) for the logical network topology. Examples of topology diagrams where discussed above by reference to FIGS. 3-5.

The process then determines (at 625) whether any changes in the VM to host mappings or the logical network configuration has occurred. For instance, the process periodically performs operations similar to operations 605-615 to determine whether there was any change in each logical network configuration. For instance, a new VM may be added to a logical network, an existing VM may removed or otherwise taken offline, a VM may migrate from one host to another host, there may be changes to the configuration of LFEs, DLRs, and gateways in a logical network.

If not, the process proceeds back to 625 (e.g., after a wait period). Otherwise, the process updates (at 630) the topology diagram of each logical network based on the changes. For instance, the process may detect that a new VM is added to a logical network and update the topology map of the logical network as discussed above by reference to FIG. 5.

The topology generator in some embodiments finds out the configured (or legitimate) links between the VMs. Two VMs are said to have a configured (or legitimate) logical link between them if they are connected through the LFEs and DLRs in the same logical network (i.e., the logical network the is connected to external networks by an edge gateway. In some embodiments, the topology generator also consider other factors such as firewall rules in other to further refine the configured logical links as the logical links between the VMs that can communicate with each other.

The topology generator determines which VM can talk to which other VMs based on the topology information gathered by the topology generator. For every VM in the topology, the topology generator determines all other VMs that the VM is connected to and marks the links between the VMs as configured (or legitimate logical links). The topology generator can trigger a health monitor in each host and pass the information regarding the configured logical links to the health monitor.

II. Logical Link Health Monitoring

In some embodiments, the health monitor in each host (e.g., health monitors 110 on hosts 160 shown in FIGS. 1-2) is implemented as a kernel module. In some embodiments, the health monitor in each host sends probe packets on the identified configured (or legitimate) logical links to detect network issues like link failure, MTU mismatch and unacceptable latencies. In some embodiments, probe packets are spoof ICMP packets. ICMP is a protocol that is used by network devices to send error messages to indicate that a destination cannot be reached or a requested service is not available. It should be understood that other types of probe packets can be sent instead of spoof ICMP packets.

The health monitor then report the success or failures back to the topology generator. Based on the reported results, the topology generator changes the colors of the logical links. For instance, a link color of green shown on a topology diagram (e.g., topology diagrams shown in FIGS. 3-5) may indicate that the logical link health is good. Another color (e.g., yellow) may indicate that the logical link has latency issues. Another color (e.g., orange) may indicate that the logical link has MTU issues. Another color (e.g., red) may indicate that the logical link is down.

The generated topology diagram is also useful for administrators to visualize any topology related misconfigurations. If the generated topology is not what the administrator expected, then the administrator can figure out if the VMs are connected to incorrect LFEs or if the LFEs are connected to wrong DLRs.

As discussed above by reference to FIG. 1, each host 160 has a logical link health monitor 100. The health monitors in some embodiments are implemented as kernel modules. Each health monitor injects ICMP spoof packets on all the configured (or legitimate) logical links. The health monitor monitors the health of these logical links by sending the ICMP spoof packets at regular intervals. For instance, the logical link health monitor interval in some embodiments may be similar to the interval of other health monitors (e.g., a health monitor used for LFEs). In some embodiments, the interval at which the health monitor injects the spoof packets is configurable.

In some embodiments, the topology generator retrieves additional information such as media access cone (MAC) and IP address of each VM from the compute manager (e.g., by using the compute manager APIs). Once the topology generator identifies all configured logical links, the topology generator sends the configured logical link information for each VM that resides on a host to the health monitor of the host.

For instance, if a VM is connected to n other VMs in the topology (i.e., the VM has n configured logical link and can send packets to the n VMs), the topology generator pushes n pairs of (source VM, destination VM) details to the health monitor of the host where the VM resides. For each link, the topology generator sends source MAC address, destination MAC address, source IP address, and destination IP address of the link to the health monitor. The source VM is the VM that resides on the same host as the health monitor. If both VMs on a configured logical link are on the same host, the topology generator in some embodiments sends two sets of information, each set of information considers one of the VMs as the source VM and the other VM as the destination VM for the purpose of sending the ICMP spoof packets.

Different embodiments utilize different methods to pass the configured logical link information from the topology generator to the health monitors. Some embodiments use a daemon that runs on each host, receives the configured logical link information from the topology generator, and passes the information to the health monitor. Other embodiments utilize a kernel shell utility (that is used to access different data structures and variables) in order to pass the information from the topology generator to the health monitor.

Figure 7:
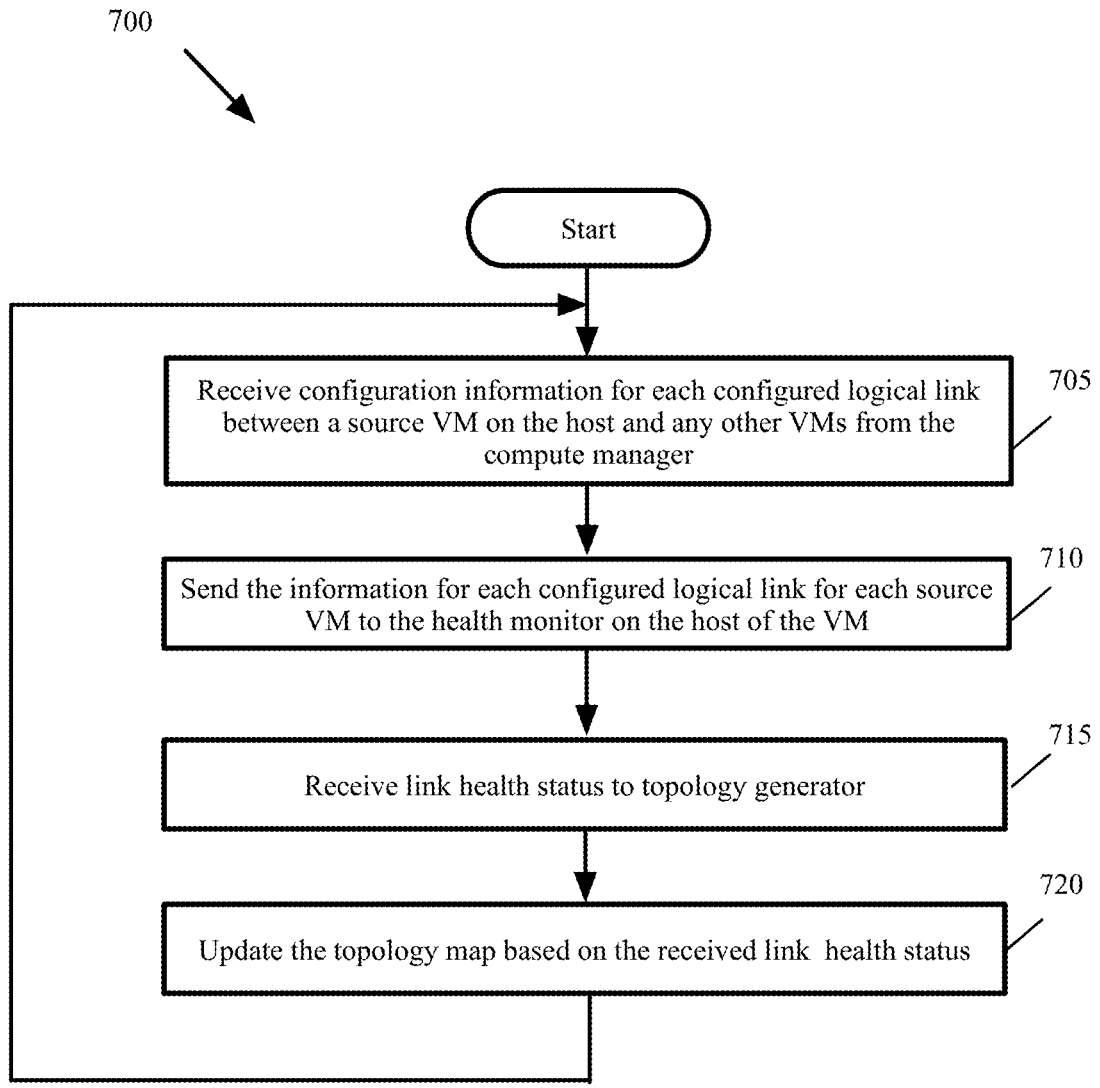
FIG. 7 conceptually illustrates a process for sending logical link information from the topology monitor to the health monitor and receiving of link health status from the health monitor in some embodiments.

FIG. 7 conceptually illustrates a process 700 for sending logical link information from the topology monitor to the health monitor and receiving of link health status from the health monitor in some embodiments. The process in some embodiments is performed by a topology generator such as the topology generator shown in FIGS. 1 and 2. As shown, the process receives (at 705) configuration information for each configured logical link between a source VM on the host and any other VMs from the compute manager. For instance, the process receives the source MAC address, destination MAC address, source IP address, and destination IP address for each link from the compute manager 120 using compute manager APIs as discussed above by reference to FIG. 2.

The process then sends (at 710) the information for each configured logical link for each source VM to the health monitor on the host of the VM. The process then receives (at 715) link health status from the health monitor. The process then updates (at 720) the topology map based on the received link health status. For instance, the process sets the color of each logical link in order to visually identify the link as healthy, as having latency issues, as having MTU issues, or as failed. The process then proceeds to 705, which was described above.

A. Sending Spoof ICMP Packets to Monitor the Network Health

Once the health monitor in a host receives the information for the configured logical links for each host, the health monitor generates spoof ICMP packets and sends the packets to other VMs (that may or may not be of the same host) over the configured logical links. ICMP packets are typically encapsulated in a Layer 3 packet (or "network" layer packet such as IP version 4 (IPv4) or IP version 6 (IPv6) packet), which is in turn encapsulated in a Layer 2 packet (or data link layer packet such as Ethernet packet). When Overlay networks are used, the ICMP packets are encapsulated in a Layer 3 packet, which is encapsulated in a Layer 2 packet, which is in turn encapsulated in an overlay network (e.g., VXLAN or GENEVE) packet.

Figure 8:
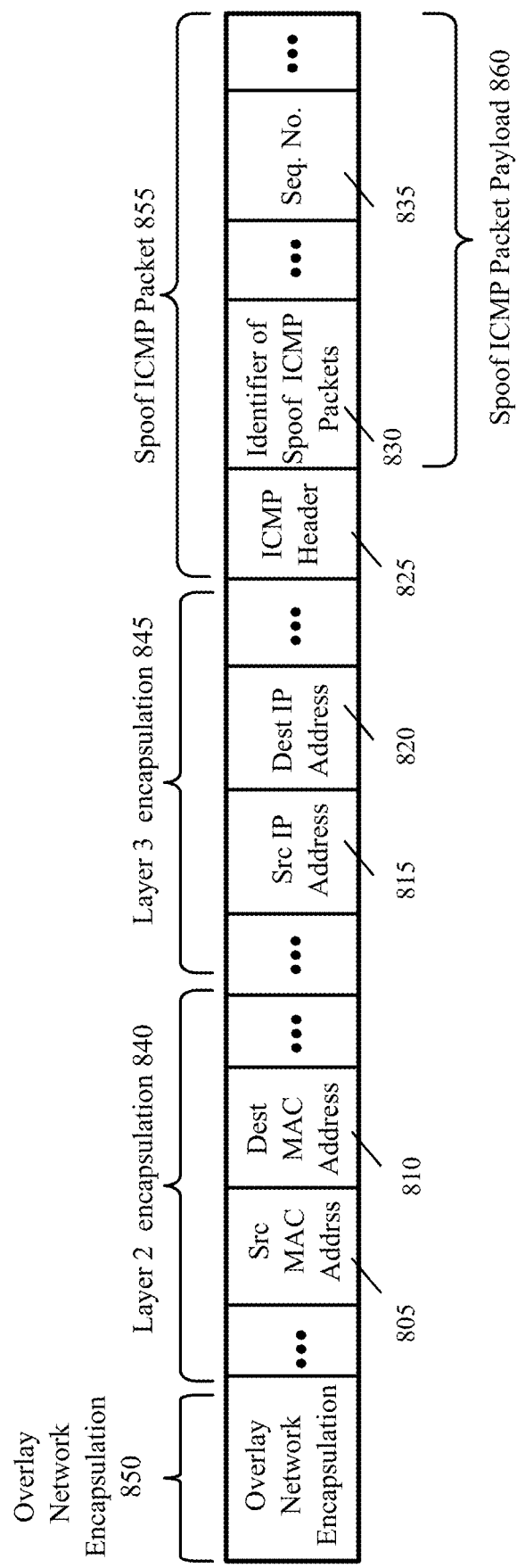
FIG. 8 conceptually illustrates a spoof ICMP packet that is sent from the health monitor on behalf of a particular VM to one of the VMs that is connected to the particular VM in some embodiments.

FIG. 8 conceptually illustrates a spoof ICMP packet that is sent from the health monitor on behalf of a particular VM to one of the VMs that is connected to the particular VM in some embodiments. A similar packet is periodically sent to every VM that is connected to the particular VM through a configured logical link.

As shown, the spoof ICMP packet 855 is encapsulated in a Layer 3 (or network layer) packet 845, which is encapsulated in a Layer 2 (or data link layer) packet 840, which is in turn encapsulated in an overlay network packet 850. Layer 2 encapsulation 840 includes source MAC address 805 and destination MAC address 810. Layer 3 encapsulation 845 includes source IP address 815 and destination IP address 820. The source MAC address 805 and the source IP address 815 are the MAC and IP addresses of the VM on whose behalf the health monitor is sending the packet. The destination MAC address 810 and the destination IP address 820 are the MAC and IP addresses of the destination VM (i.e., the VM on the other end of the configured logical link).

The spoof ICMP packet 855 includes a header 825 and a payload 860. The spoof ICMP packet includes an identifier 830, which is an identifier (or a magic number) that is added to the spoof ICMP packets in order to distinguish the spoof packets that the health monitor injects with the regular ICMP packets. In some embodiments, the spoof packet identifier is the same for all spoof packets that are injected by the health monitors.

In some embodiments, the identifier of the spoof packets 825 is included in the first few bytes of the spoof ICMP packet payload 860. The health monitor also embeds a unique sequence number 835 in the spoof ICMP packet (e.g., in the sequence field of the ICMP packet) in order to uniquely identify various packets the health monitor injects. Once the health monitor builds the packet, the health monitor injects this packet through the MFE port that the source VM is connected to. As discussed above, each host machine in the network includes an MFE for forwarding network traffic to and from the virtual machines. Each VM in the host machine connects to a port of the host MFE through a virtual network interface card (VNIC). The host MFEs are then configured to logically forward data messages according to LFEs configured by an administrator of the network in order to implement the LFEs. The health monitor generates the spoof ICMP packets for each VM and injects the packets through the MFE port used by the source VM in order for the packet as if the packet was initiated by the source VM.

B. Examining Responses to the Spoof ICMP Packets

In order to examine the responses receive for the spoof packet, some embodiments use a kernel-level packet handling process (referred to as an IOChain) on the MFE port to which each source VM is connected. The IOChain acts as a filter and processes the responses to spoof ICMP packets that were injected into the MFE port. The IOChain only examines the ICMP packets that have the identifier (or magic number) 830 shown in FIG. 8 associated with the spoof ICMP packets in their payload 860.

The health monitor also maintains a state for all packets injected and the time at which the packets are sent (e.g., in the form of a pending list) in order to compare the packets with their corresponding responses. The health monitor also has a timer, which expires at regular interval in order to check the pending list to determine which packets have got responses and which packets didn't.

If the response to a packet is received after a first threshold (e.g., 200 millisecond, 400 millisecond, etc.), the link between source and destination VMs is marked as having latency issues. If there is no response after a second threshold (e.g., 800 millisecond, 1 second, etc.) then the link is marked as down.

In order to determine MTU issues, the health monitor in some embodiments sends several packets (e.g., 3 packets) with varied sizes to each destination VM. The MTU is the maximum number of bytes an individual packet (or datagram) can have on a communication link. The health monitor, for example, sends packets with 1500, 1600, and 9000 bytes per configured logical link. If none of these packets receives an MTU failure response (e.g., an ICMP packet indicating the datagram is too big), the link is marked as free of MTU issues.

Once the health monitor analyses the responses (or lack thereof) to the spoof ICM packets, the health monitor send the results of the analysis back to the topology generator so that the topology generator can alert the user (e.g., by changing the color of the logical link on the topology diagram.

Figure 9:
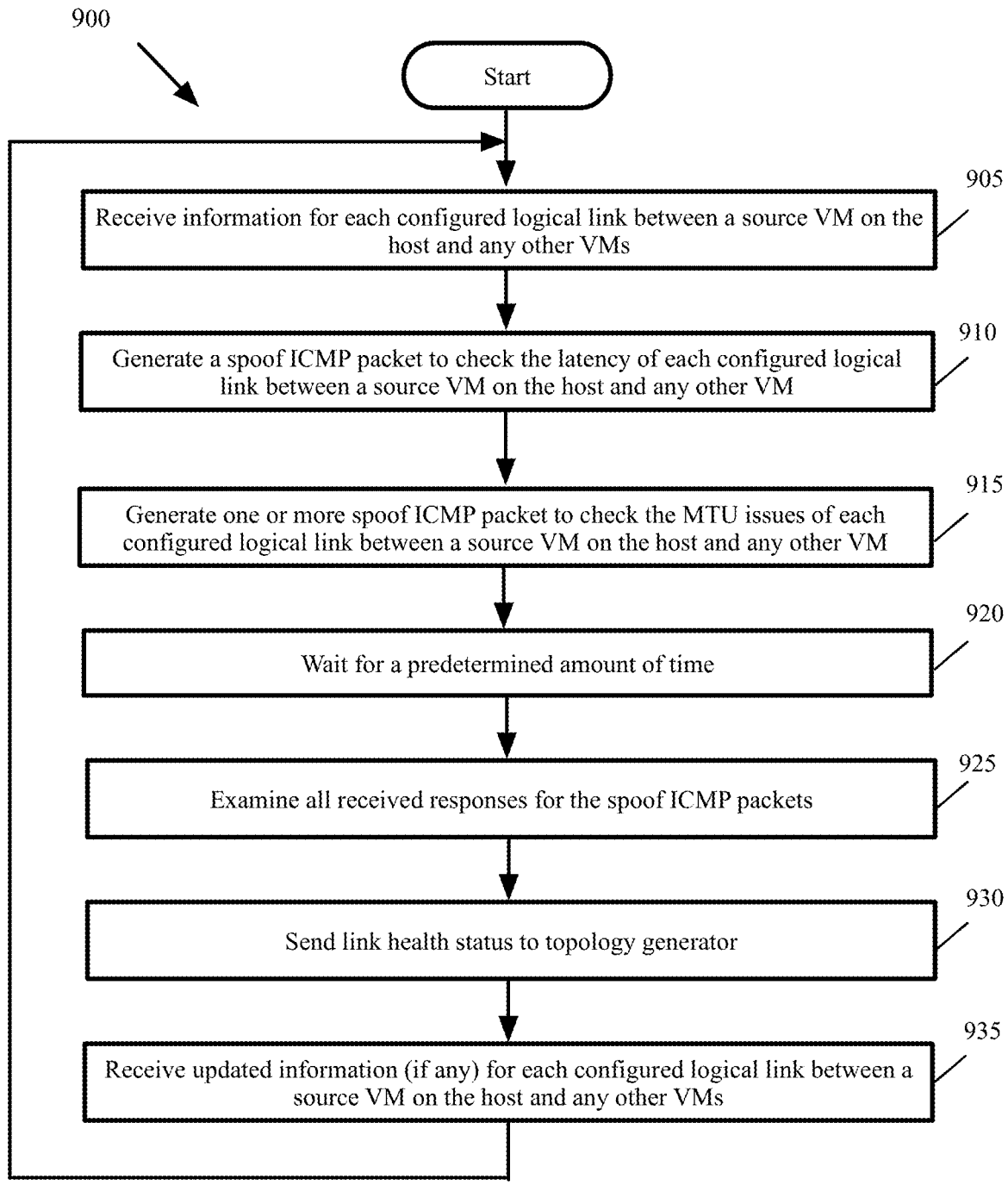
FIG. 9 conceptually illustrates a process for generating spoof ICMP packets and examining the corresponding responses.

FIG. 9 conceptually illustrates a process 900 for generating spoof ICMP packets and examining the corresponding responses. The process in some embodiments is performed by a logical link health monitor such as any of logical link health monitors 110 in FIGS. 1-2. As shown, the process receives (at 905) information for each configured logical link between a VM (referred to as source VM) on the host and any other VMs on the same or other hosts. For instance, the process receives the source MAC address, destination MAC address, source IP address, and destination IP address for each link from the topology generator.

The process then generates (at 910) a spoof ICMP packet to check the latency of each configured logical link between a source VM on the host and any other VMs on the same or other hosts. The process then generates (at 915) one or more spoof ICMP packet to check the MTU issues of each configured logical link between a source VM on the host and any other VM.

The process then waits (at 920) for a predetermined amount of time. For instance, the process set a timer and wakes up (or gets triggered) at the expiration of the timer. The process then examines (at 925) all received responses for the spoof ICMP packets. Details of the examination of the packets sent for latency check and MTU issues check are described below by reference to FIGS. 10-11, respectively.

The process then sends (at 930) the link health status to the topology generator. The process then receives (at 935) updated information (if any) for each configured logical link between a source VM on the host and any other VMs. For instance, as described above, the topology generator periodically receives updated configuration information from the compute and network managers and pushes the updated information to the health monitor. The process then proceeds to 1008, which was described above.

Figure 10:
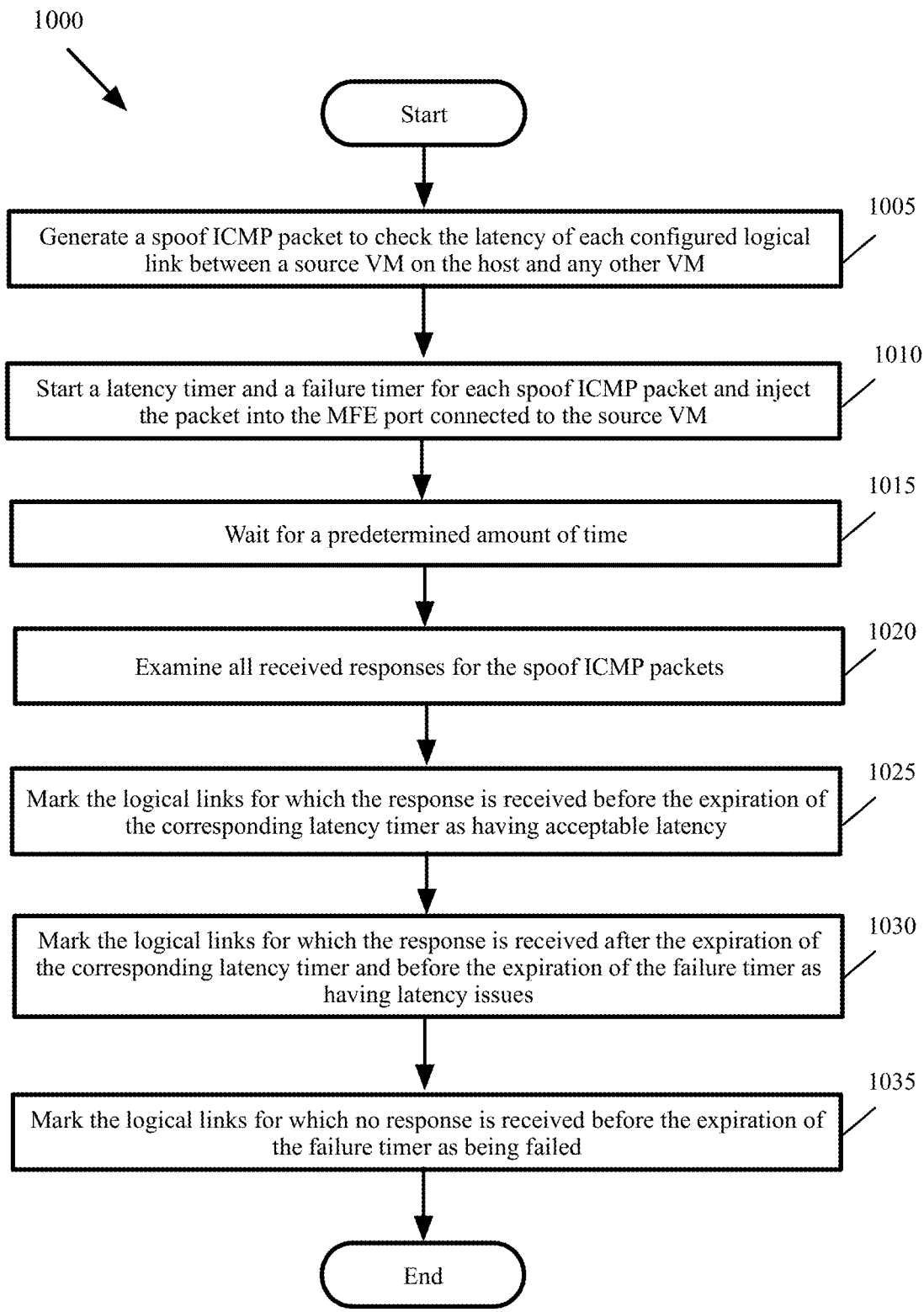
FIG. 10 conceptually illustrates a process for generating spoof ICMP packets and examining the corresponding responses for the determining latency issues with the configured links.

FIG. 10 conceptually illustrates a process 1000 for generating spoof ICMP packets and examining the corresponding responses for the determining latency issues with the configured links. The process in some embodiments is performed by a logical link health monitor such as any of logical link health monitors 110 in FIGS. 1-2.

As shown, the process generates (at 1005) a spoof ICMP packet to check the latency of each configured logical link between a source VM on the host and any other VM. The process then starts (at 1010) a latency timer and a failure timer for each spoof ICMP packet and injects the packet into the MFE port connected to the source VM.

The process then waits (at 1015) for a predetermined amount of time. The process then examines (at 1020) all received responses for the spoof ICMP packets. The process marks (at 1025) the logical links for which the response is received before the expiration of the corresponding latency timer as having acceptable latency.

The process marks (at 1030) the logical links for which the response is received after the expiration of the corresponding latency timer and before the expiration of the failure timer as having latency issues. The process marks (at 1035) the logical links for which no response is received before the expiration of the failure timer as being failed. The process then ends. Process 1000 is periodically performed by the health monitor in order to dynamically monitor the health of the logical links.

Figure 11:
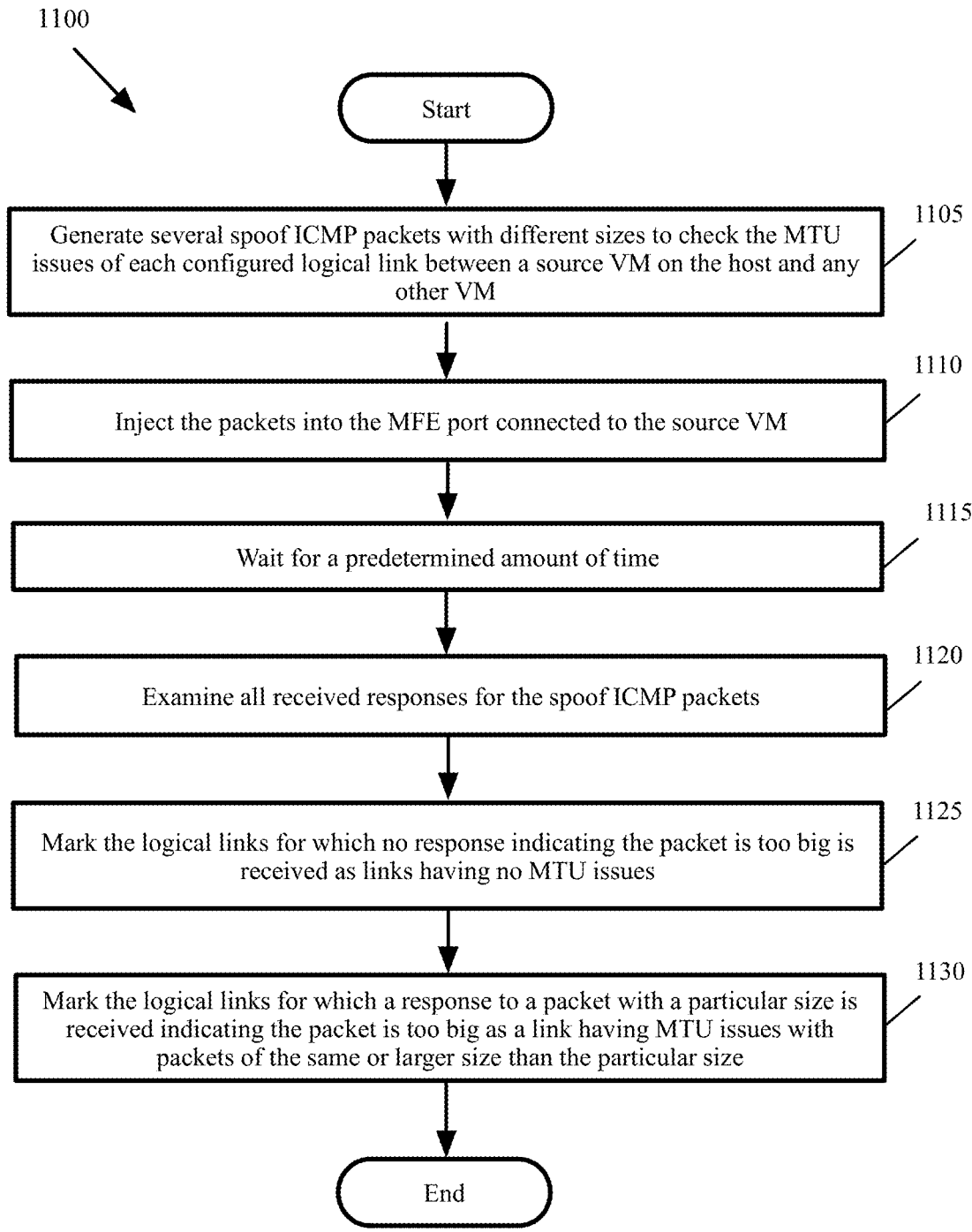
FIG. 11 conceptually illustrates a process for generating spoof ICMP packets and examining the corresponding responses for the determining MTU issues with the configured links.

FIG. 11 conceptually illustrates a process 1100 for generating spoof ICMP packets and examining the corresponding responses for the determining MTU issues with the configured links. The process in some embodiments is performed by a logical link health monitor such as any of logical link health monitors 110 in FIGS. 1-2.

As shown, the process generates (at 1105) several spoof ICMP packets with different sizes to check the MTU issues of each configured logical link between a source VM on the host and any other VM. The process then injects (at 1110) the packets into the MFE port connected to the source VM.

The process then waits (at 1115) for a predetermined amount of time. The process then examines (at 1120) all received responses for the spoof ICMP packets. The process marks (at 1125) the logical links for which no response indicating the packet is too big is received as links having no MTU issues. The process marks (at 1130) the logical links for which a response to a packet with a particular size is received indicating the packet is too big as a link that has MTU issues with packets of the same or larger size than the particular size. The process then ends. Process 1100 is periodically performed by the health monitor in order to dynamically monitor the health of the logical links.

Figure 12:
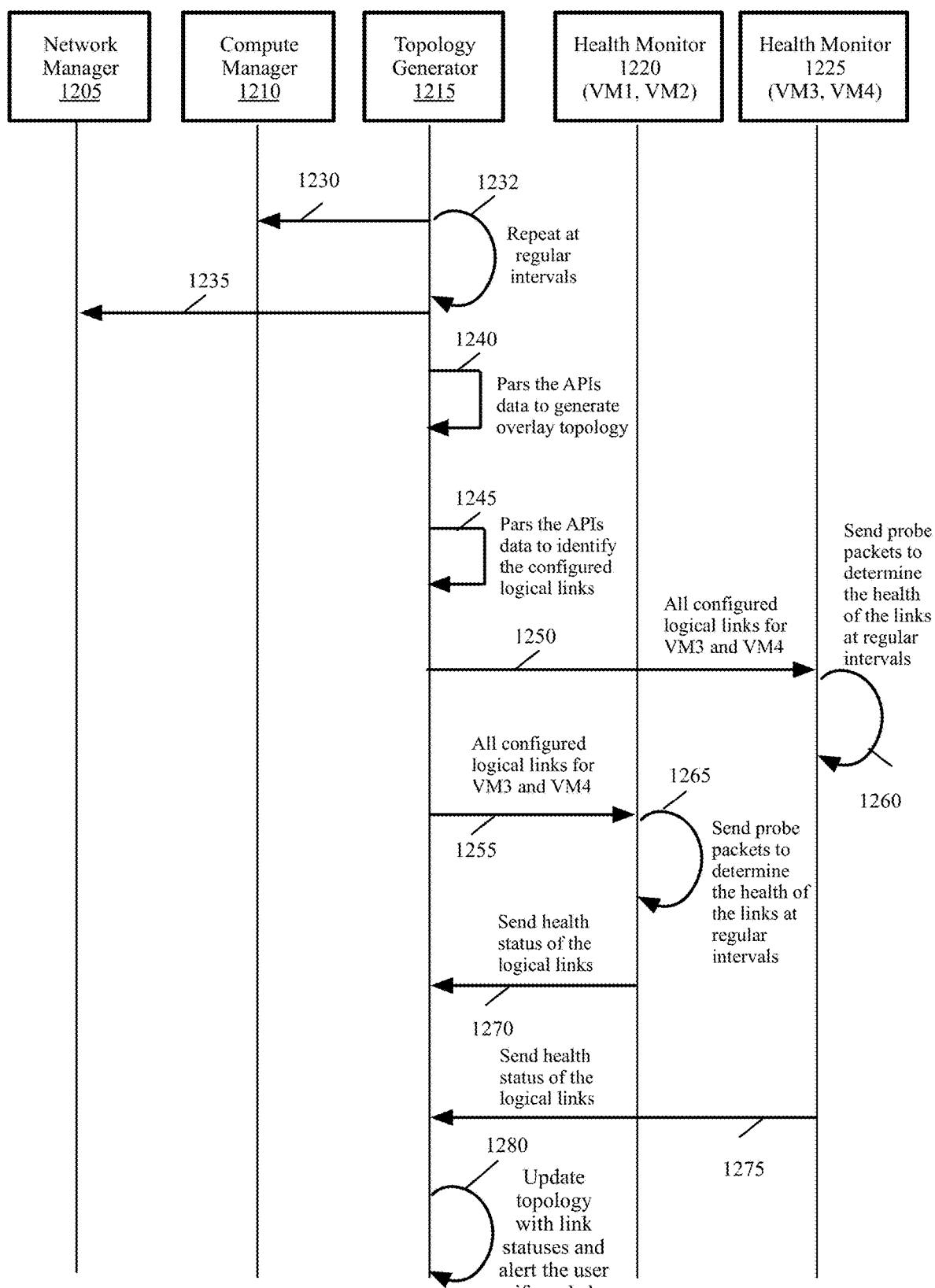
FIG. 12 conceptually illustrates a sequence flow diagram for a health checker of some embodiments that includes a topology generator and one or more health monitors.

FIG. 12 conceptually illustrates a sequence flow diagram for a health checker of some embodiments that includes a topology generator and one or more health monitors. The figure shows a network manager 1205, a compute manager 1210, a topology generator 1215, and two health monitors 1220 and 1225. Health monitor 1220 runs on a host that is hosting VM1 and VM2. Health monitor 1225 runs on a host that is hosting VM3 and VM4.

As shown, topology generator 1215 at regular intervals (as shown by 1232) sends (at 1230 and 1235) API requests to the network manager 1205 and compute manager 1210. Topology generator 1215 parses (at 1240) the API data to generate the overlay topology.

Topology generator 1215 also parses (at 1245) the APIs data to determine the configured logical links. Topology generator 1215 sends (at 1250) information for all configured logical links for VM3 and VM4 to health monitor 1225. Topology generator 1215 also sends (at 1255) information for all configured logical links for VM1 and VM2 to health monitor 1220.

Health monitor 1225 sends (at 1260) probe packets at regular intervals to determine the health of the configured logical links of VM3 and VM4. Health monitor 1220 sends (at 1265) probe packets at regular intervals to determine the health of the configured logical links of VM1 and VM2.

Health monitor 1220 sends (at 1270) the status of the logical links' health to the topology generator 1215. Health monitor 1225 sends (at 1275) the status of the logical links' health to the topology generator 1215. The topology monitor updates (at 1280) the topology based on the link statuses and generate alerts if needed.

C. Advantages of Using Dynamic Topology Generator and Logical Links Health Monitor The use of a health checker that includes the dynamic topology generator and logical link health monitoring reduces the time-to-relief with some of the most common network escalations dealing with latencies, MTU configuration issues, and link down issues. The administrators are enabled to monitor the health of the logical links and troubleshoot the issues.

Some embodiments also trigger log collection from the destination hosts of the logical links that have issues and use the logs for troubleshooting. The topology generator generates overlay network topology diagrams, which reduces the back and forth questions with the customers in order to understand the customers' network deployment. This topology diagram generated by the topology generator enables engineers, customer support services, as well as the customers to get a complete picture of the network overlay topology. The generated topology diagram is also useful for administrators to check if there are any topology related misconfigurations. All of these advantages in turn help avoiding any misdiagnoses of network issues.

The health checker is a proactive rather than demand-based way to monitor the health of the overlay links. Existing solutions are on demand based. The health checker proactively and periodically measures the health of the overlay links and notifies the administrators of the failed links or links with latency issues. Since the logical link health monitor is aware of the topology, the reachability test is performed with optimized number of test packets.

Instead of troubleshooting networking issues after the networking issue becomes visible, the disclosed health checker performs constant monitoring and notifies the administrators of the failed logical links, close to the failure time. The disclosed health checker pinpoints and identifies the exact link failure.

One of the advantages of the disclosed health checker is the information required to generate the topology is gathered using the REST APIs and compute manager APIs as discussed above by reference to FIG. 2. There is no need to send probe packets to figure out the topology and no additional overhead is generated by sending probe determine the topology. In addition, sending probe packets only finds out the topology between two IP endpoints. In contrast, the disclosed health checker figures out the complete topology by analyzing the information received through the APIs from the compute and network manager servers.

The topology diagrams discussed above by reference to FIGS. 3-5 presents a simple way to the user to visualize all entities (VMs, LFEs, DLRs, edge gateways) in each overlay network and how the entities are connected to each other. There is no need to specify which two endpoints the user wants to monitor. The health checker monitors the whole network and alerts the user when there is a health issue.

The health checker does not require any changes to the overlay network or tunneling protocols in order to monitor the health of the overlay links. The health checker uses the available configuration information gathered from the compute and network manager servers.

III. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 13 conceptually illustrates an electronic system 1300 with which some embodiments of the invention are implemented. The electronic system 1300 can be used to execute any of the control, virtualization, or operating system applications described above. The electronic system 1300 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1300 includes a bus 1305, processing unit(s) 1310, a system memory 1320, a read-only memory (ROM) 1330, a permanent storage device 1335, input devices 1340, and output devices 1345.

The bus 1305 collectively represents all system, peripheral, and chipset buses that communicatively connect the numerous internal devices of the electronic system 1300. For instance, the bus 1305 communicatively connects the processing unit(s) 1310 with the read-only memory 1330, the system memory 1320, and the permanent storage device 1335.

From these various memory units, the processing unit(s) 1310 retrieve instructions to execute and data to process in order to execute the processes of the invention. The processing unit(s) may be a single processor or a multi-core processor in different embodiments.

The read-only-memory 1330 stores static data and instructions that are needed by the processing unit(s) 1310 and other modules of the electronic system. The permanent storage device 1335, on the other hand, is a read-and-write memory device. This device is a non-volatile memory unit that stores instructions and data even when the electronic system 1300 is off. Some embodiments of the invention use a mass-storage device (such as a magnetic or optical disk and its corresponding disk drive) as the permanent storage device 1335.

Other embodiments use a removable storage device (such as a floppy disk, flash drive, etc.) as the permanent storage device. Like the permanent storage device 1335, the system memory 1320 is a read-and-write memory device. However, unlike storage device 1335, the system memory is a volatile read-and-write memory, such as random access memory. The system memory stores some of the instructions and data that the processor needs at runtime. In some embodiments, the invention's processes are stored in the system memory 1320, the permanent storage device 1335, and/or the read-only memory 1330. From these various memory units, the processing unit(s) 1310 retrieve instructions to execute and data to process in order to execute the processes of some embodiments.

The bus 1305 also connects to the input and output devices 1340 and 1345. The input devices enable the user to communicate information and select commands to the electronic system. The input devices 1340 include alphanumeric keyboards and pointing devices (also called "cursor control devices"). The output devices 1345 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 13, bus 1305 also couples electronic system 1300 to a network 1325 through a network adapter (not shown). In this manner, the computer can be a part of a network of computers (such as a local area network ("LAN"), a wide area network ("WAN"), or an Intranet, or a network of networks, such as the Internet. Any or all components of electronic system 1300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 6-7 and 9-12) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. A method of generating a network topology diagram in a datacenter comprising a network manager server and a set of host computers, a set of data compute nodes (DCNs) executing on each host computer, each of at least a plurality of the host computers executing a plurality of DCNs, the method comprising:

receiving information regarding a configuration of each of a set of logical overlay networks from the network manager server, each logical overlay network connected to a plurality of DCNs;

identifying logical connections configured between the DCNs using the configuration of the logical overlay networks;

generating the network topology diagram based on the identified logical connections, the network topology diagram identifying the DCNs that are connected to each logical overlay network and links connected to the DCNs to represent the logical connections associated with the DCNs;

sending health-check messages to each of the DCNs and analyzing responses from the DCNs to the health-check messages to identify the health of the links connected to the DCNs; and displaying the network topology diagram on a graphical user interface, said displaying comprising displaying at least one particular link connected to one DCN differently than a plurality of other links connected to other DCNs in order to identify the health of the particular link.

2. The method of claim 1, wherein the datacenter further comprises a compute manager, the method further comprising:

receiving information regarding the DCNs that execute on each host computer from the compute manager server;

wherein generating the network topology diagram further comprises using the information regarding the DCNs that execute on each host computer.

3. The method of claim 2 further comprising:

receiving information regarding changes to the configuration of each logical overlay network from the compute manager;

updating the network topology diagram based on the changes, and displaying the updated network topology diagram on the graphical user interface.

4. The method of claim 2 further comprising:

receiving information regarding a change in the DCNs that execute on a host computer from the compute manager server;

updating the network topology diagram based on the changes, and displaying the updated network topology diagram on the graphical user interface.

5. The method of claim 1, wherein receiving information regarding the configuration of each logical overlay network comprises receiving an identification of each DCN, each logical forwarding element, each virtual logical router, and each edge gateway connected to the logical overlay network.

6. The method of claim 1, wherein each logical overlay network is an overlay network configured by a tenant of the datacenter.

7. The method of claim 1, wherein sending the health-check messages comprises:

sending spoof Internet control message protocol (ICMP) packets to each destination DCN; and analyzing responses and lack of responses for each spoof ICMP packet to determine the health of each configured logical link.

8. The method of claim 7 further comprising:

utilizing the determined health of each configured logical link to visually identify a health status of each configured logical link as one of healthy, having latency issues, having maximum transmission unit (MTU) issues, and failed.

9. The method of claim 7, wherein the spoof ICMP packets comprise spoof ICMP packets sent to determine latency issues of each configured logical link, the method further comprising:

starting a first timer and a second timer at a time of sending each spoof ICMP packet, the second timer having a longer expiration time than the first timer;

marking each logical link for which a response to the spoof ICM packet is received before an expiration of the first timer as a health logical link;

marking each logical link for which a response to the spoof ICM packet is received after the expiration of the first timer and before an expiration of the second timer as a link having latency issues; and marking each logical link for which no response is received to the spoof ICM packet before the expiration of the second timer as a failed logical link.

10. The method of claim 7, wherein the spoof ICMP packets comprise spoof ICMP packets sent to determine maximum transmission unit (MTU) issues, the method further comprising:

sending a plurality of spoof ICMP packets with different sizes to each destination VM over each configured logical link;

marking each logical link as having an acceptable MTU when no response indicating a spoof ICMP packet is too big over the logical link; and marking each logical link as having an MTU issue with a particular packet size when a response is received to a spoof ICMP packet with the particular size indicating the packet is too big.

11. A non-transitory machine readable medium storing a program that when executed by at least one processing unit generates a network topology diagram in a datacenter comprising a network manager server and a set of host computers, a set of data compute nodes (DCNs) executing on each host computer, each of at least a plurality of the host computers executing a plurality of DCNs, the program comprising sets of instructions for:

receiving information regarding a configuration of each of a set of logical overlay networks from the network manager server, each logical overlay network connected to a plurality of DCNs;

identifying logical connections configured between the DCNs using the configuration of the logical overlay networks;

generating the network topology diagram based on the identified logical connections, the network topology diagram identifying the DCNs that are connected to each logical overlay network;

sending health-check messages to each of the DCNs and analyzing responses from the DCNs to the health-check messages to identify the health of the links connected to the DCNs; and displaying the network topology diagram on a graphical user interface.

12. The non-transitory machine readable medium of claim 11, wherein the datacenter further comprises a compute manager, the program further comprising a set of instructions for:

receiving an identification of the DCNs executed by each host computer from the compute manager server;

wherein the set of instructions for generating the network topology diagram further comprises a set of instructions for using the identification of the DCNs to determine the DCNs that execute on each host computer.

13. The non-transitory machine readable medium of claim 12, the program further comprising sets of instructions for:
receiving information regarding changes to the configuration of each logical overlay network from the compute manager;
updating the network topology diagram based on the changes, and
displaying the updated network topology diagram on the graphical user interface.

14. The non-transitory machine readable medium of claim 12, the program further comprising sets of instructions for:
receiving information regarding a change in the DCNs that execute on a host computer from the compute manager server;
updating the network topology diagram based on the changes, and
displaying the updated network topology diagram on the graphical user interface.

15. The non-transitory machine readable medium of claim 11, wherein receiving information regarding the configuration of each logical overlay network comprises receiving an identification of each DCN, each logical forwarding element, each virtual logical router, and each edge gateway connected to the logical overlay network.

16. The non-transitory machine readable medium of claim 11, wherein each logical overlay network is an overlay network configured by a tenant of the datacenter.

17. The non-transitory machine readable medium of claim 11, wherein the set of instructions for sending the health-check messages comprises sets of instructions for:
sending spoof Internet control message protocol (ICMP) packets to each destination DCN; and
analyzing responses and lack of responses for each spoof ICMP packet to determine the health of each configured logical link.

18. The non-transitory machine readable medium of claim 17, the program further comprising sets of instructions for:
utilizing the determined health of each configured logical link to visually identify a health status of each configured logical link as one of healthy, having latency issues, having maximum transmission unit (MTU) issues, and failed.

19. The non-transitory machine readable medium of claim 17, wherein the spoof ICMP packets comprise spoof ICMP packets sent to determine latency issues of each configured logical link, the program further comprising sets of instructions for:
starting a first timer and a second timer at a time of sending each spoof ICMP packet, the second timer having a longer expiration time than the first timer;
marking each logical link for which a response to the spoof ICM packet is received before an expiration of the first timer as a health logical link;
marking each logical link for which a response to the spoof ICM packet is received after the expiration of the first timer and before an expiration of the second timer as a link having latency issues; and
marking each logical link for which no response is received to the spoof ICM packet before the expiration of the second timer as a failed logical link.

20. The non-transitory machine readable medium of claim 17, wherein the spoof ICMP packets comprise spoof ICMP packets sent to determine maximum transmission unit (MTU) issues, the program further comprising sets of instructions for:
sending a plurality of spoof ICMP packets with different sizes to each destination VM over each configured logical link;
marking each logical link as having an acceptable MTU when no response indicating a spoof ICMP packet is too big over the logical link; and
marking each logical link as having an MTU issue with a particular packet size when a response is received to a spoof ICMP packet with the particular size indicating the packet is too big.

* * * * *